(12) United States Patent
Tan et al.

(10) Patent No.: US 10,377,310 B2
(45) Date of Patent: *Aug. 13, 2019

(54) VEHICLE OBJECT DETECTION SYSTEM

(71) Applicant: Nissan North America, Inc., Franklin, TN (US)

(72) Inventors: Adrian Tan, Northville, MI (US); William M Tierney, Jr., Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/799,538

(22) Filed: Oct. 31, 2017

(65) Prior Publication Data

US 2018/0050637 A1 Feb. 22, 2018

Related U.S. Application Data

(63) Continuation of application No. 14/525,397, filed on Oct. 28, 2014, now Pat. No. 9,834,141.

(51) Int. Cl.
*H04N 7/18* (2006.01)
*B60R 1/00* (2006.01)

(52) U.S. Cl.
CPC .......... *B60R 1/00* (2013.01); *B60R 2300/301* (2013.01); *B60R 2300/8093* (2013.01)

(58) Field of Classification Search
CPC .. B60R 1/002; B60R 1/00; G01C 3/00; H04N 7/183; G08G 1/16; G08G 1/165; G08G 1/166

USPC ............................................ 348/142, 46, 118
See application file for complete search history.

(56) References Cited

U.S. PATENT DOCUMENTS

| | | | |
|---|---|---|---|
| 5,604,818 A | 2/1997 | Saitou et al. | |
| 5,949,331 A | 9/1999 | Schofield et al. | |
| 6,483,429 B1 | 11/2002 | Yasui et al. | |
| 6,593,960 B1 | 7/2003 | Sugimoto et al. | |
| 7,592,928 B2 | 9/2009 | Chinomi et al. | |
| 7,969,326 B2 | 6/2011 | Sakakibara | |
| 7,984,574 B2 | 7/2011 | Pfohl et al. | |
| 8,077,203 B2 | 12/2011 | Abe | |
| 8,154,426 B2 | 4/2012 | Endo et al. | |

(Continued)

FOREIGN PATENT DOCUMENTS

| | | |
|---|---|---|
| DE | 19741896 A1 | 4/1999 |
| FR | 2979299 A1 | 3/2013 |

(Continued)

*Primary Examiner* — Sathyanaraya V Perungavoor
*Assistant Examiner* — Peet Dhillon
(74) *Attorney, Agent, or Firm* — Global IP Counselors, LLP

(57) ABSTRACT

A vehicle object detection system having a controller configured to process object information received from the plurality of sensors and determine the distance between an outer surface of a vehicle body structure and an object. The controller displays on a video display a faux representation of the object, a faux representation of the outer surface of the vehicle body structure and a numeric representation of the distance between the outer surface of the vehicle body structure and the object. The controller is further configured to switch between operating the video display in display modes including a parallel parking view mode and a backup mode.

18 Claims, 10 Drawing Sheets

(56) References Cited

U.S. PATENT DOCUMENTS

| | | |
|---|---|---|
| 8,155,385 B2 | 4/2012 | Mizuta |
| 8,218,008 B2 | 7/2012 | Wu et al. |
| 8,243,994 B2 | 8/2012 | Suzuki et al. |
| 8,310,376 B2 | 11/2012 | Frank et al. |
| 8,332,097 B2 | 12/2012 | Chiba et al. |
| 2002/0003571 A1 | 1/2002 | Schofield et al. |
| 2004/0119610 A1* | 6/2004 | Maemura ............... B60Q 9/005 340/932.2 |
| 2006/0256198 A1 | 11/2006 | Nishiuchi |
| 2008/0205706 A1 | 8/2008 | Hongo |
| 2009/0121899 A1 | 5/2009 | Kakinami et al. |
| 2009/0122140 A1 | 5/2009 | Imamura |
| 2010/0123778 A1 | 5/2010 | Hada |
| 2010/0238051 A1 | 9/2010 | Suzuki et al. |
| 2010/0329510 A1 | 12/2010 | Schmid |
| 2012/0069182 A1 | 3/2012 | Sumi et al. |
| 2012/0326917 A1 | 12/2012 | Kiehne |
| 2012/0327239 A1 | 12/2012 | Inoue et al. |
| 2013/0093583 A1* | 4/2013 | Shapiro ............... G01S 15/931 340/436 |
| 2013/0107052 A1 | 5/2013 | Gloger et al. |
| 2014/0160011 A1 | 6/2014 | Park et al. |
| 2014/0211916 A1 | 7/2014 | Morton |
| 2015/0042797 A1 | 2/2015 | Alam et al. |

FOREIGN PATENT DOCUMENTS

| | | |
|---|---|---|
| JP | 2007-255976 A | 10/2007 |
| JP | 4724522 B2 | 7/2011 |
| JP | 4765213 B2 | 9/2011 |
| JP | 5386850 B2 | 1/2014 |
| WO | 2012-172580 A1 | 12/2012 |
| WO | 2014-054239 A1 | 4/2014 |

* cited by examiner

US 10,377,310 B2

VEHICLE OBJECT DETECTION SYSTEM

CROSS-REFERENCE TO RELATED APPLICATIONS

This application is a continuation application of U.S. patent application Ser. No. 14/525,397 filed on Oct. 28, 2014. The entire disclosure of U.S. patent application Ser. No. 14/525,397 is hereby incorporated herein by reference.

BACKGROUND

Field of the Invention

The present invention generally relates to a vehicle object detection system. More specifically, the present invention relates to an object detection system that determines the distance of an object from a vehicle as the vehicle approaches the object.

Background Information

Many vehicles are provided with video cameras that are aimed at areas adjacent to respective sides of the vehicles and are employed during maneuvers such as, for example, parking and/or backing up. These cameras are conventionally angled downward such that they generally indicate the presence of objects within the camera's field of view but do not provide any distance measurement or other accurate indication of proximity to the objects.

SUMMARY

One object of the disclosure is to provide a vehicle with an object detection system that determines distance between an object and the vehicle as the vehicle approaches the object.

Another object of the disclosure is to provide with an object detection system of a vehicle with a video display that displays a numeric value of the actual distance between a detected object relative and an adjacent surface of the vehicle as the vehicle approaches the object.

In view of the state of the known technology, one aspect of the disclosure includes a vehicle object detection system having a vehicle body structure, a plurality of sensors, a video display and a controller. The vehicle body structure has an outer surface and defining a vehicle longitudinal direction. The plurality of sensors are configured to detect an object within a prescribed area adjacent to the outer surface of the vehicle body structure. The video display is installed to the vehicle body structure. The controller is configured to process object information received from the plurality of sensors, determine the distance between the outer surface of the vehicle body structure and the object, and display on the video display a faux representation of the object, a faux representation of the outer surface of the vehicle body structure and a numeric representation of the distance between the outer surface of the vehicle body structure and the object. The controller is further configured to switch between operating the video display in display modes including a parallel parking view mode and a backup mode. In the parallel parking view mode, the faux representation of the outer surface includes a faux representation of the one of the passenger's side of the vehicle or the driver's side of the vehicle looking in a horizontal direction parallel to the vehicle longitudinal direction from one end of the vehicle with a faux representation of the prescribed area being adjacent to the one of the passenger's side or the driver's side of the vehicle. In the backup mode the faux representation of the outer surface includes a faux representation of the rear bumper fascia looking from one side thereof with a faux representation of the prescribed area being adjacent to a rear end of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
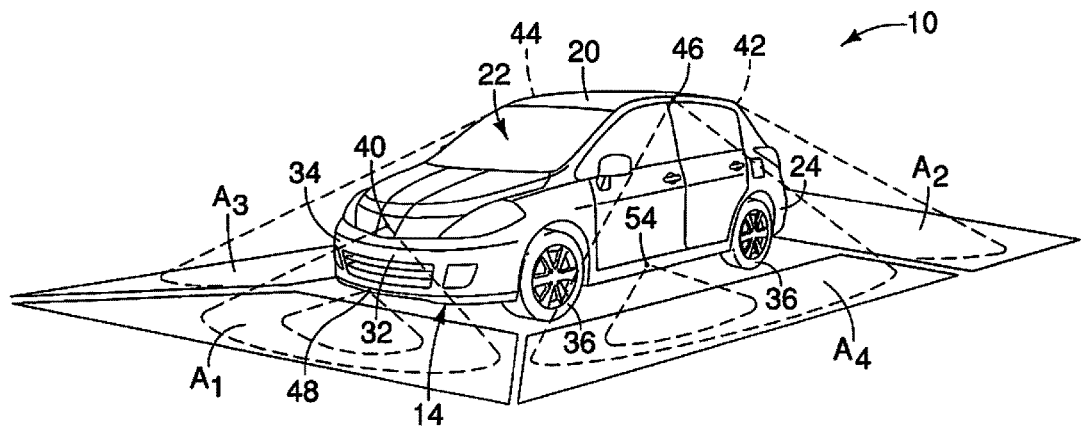
FIG. 1 is a perspective view of a vehicle having an object detection system being aimed at respective areas adjacent to side surfaces of the vehicle, with the respective areas superimposed around the vehicle in accordance with a first embodiment.

Referring initially to FIG. 1, a vehicle 10 is illustrated in accordance with a first embodiment. The vehicle 10 includes an object detection system 12 (FIG. 2) that is configured to determine/measure the distance between an object and an approaching outer surface 14 of the vehicle 10. Further, the distance is determined and displayed such that a vehicle operator (not shown) is provided with the distance and a warning and/or indication of the proximity of the object to the vehicle 10 as the vehicle 10 continues to move toward the object, as is described in greater detail below.

As shown in FIG. 1, the vehicle 10 includes a vehicle body structure 20 that defines a passenger compartment 22, a rear bumper fascia 24, an instrument panel 26 within the passenger compartment and the outer surface 14. The vehicle body structure 20 defines a vehicle longitudinal direction D along a lengthwise direction of the vehicle 10, as shown in FIG. 1. In the description below, the outer surface 14 includes a rear surface of the vehicle 10, such as the rearmost surface of the rear bumper fascia 24. However, as will be understood from the drawings and the description herein below, the outer surface 14 can include any of the outer surfaces of the vehicle body structure 20 adjacent to a detected object as the outer surface 14 approaches the detected object.

For instance, the outer surface 14 of the vehicle body structure 20 can be defined as any one, or combinations of outermost surfaces of the vehicle 10. For example, the outer surface 14 can be a front surface 32 of a front bumper fascia 34, a surface of one of the wheels 36, the rearmost surface of the rear bumper fascia 24 and/or surfaces of fenders adjacent to the wheels 36. For purposes of understanding the object detection system 12, the outer surface 14 is any one or ones of the outer surfaces of the vehicle 10 or wheel 36 that might possibly come into contact a detected object when the vehicle 10 is moving toward that object, such as during parking and/or backing up, as is described in greater detail below.

Figure 2:
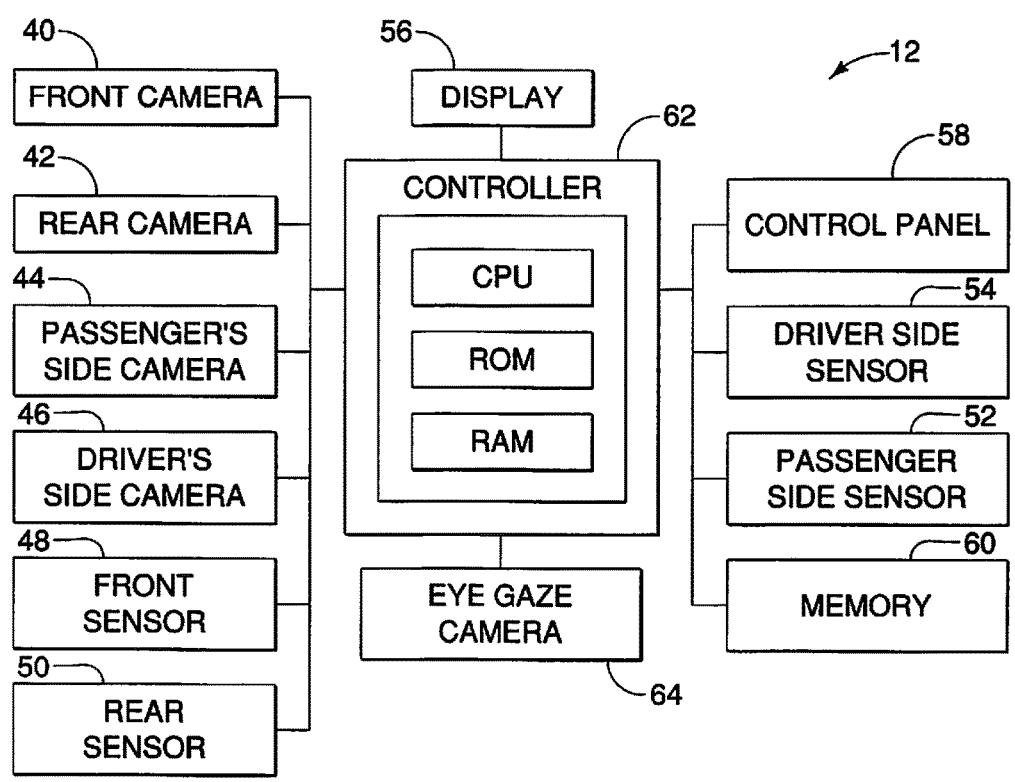
FIG. 2 is a block diagram of the object detection system of the vehicle depicted in FIG. 1, the object detection system including, among other elements, a plurality of the cameras, a plurality of sensors, a controller, a control panel and a video display in accordance with the first embodiment.

As shown in FIG. 2, the object detection system 12 basically includes a front camera 40, a rear camera 42, a passenger's side camera 44, a driver's side camera 46, a front sensor 48, a rear sensor 50, a passenger's side sensor 52, a driver's side sensor 54, a video display 56, a control panel 58, memory 60, a controller 62 and an eye gaze camera 64. The various elements of the object detection system 12 are installed at predetermined locations on or within the vehicle body structure 20 of the vehicle 10. For example, as shown in FIG. 1, the front camera 40 is installed to a front surface of the vehicle body structure 20 above the front bumper fascia 34. Although not visible in FIG. 1, the rear camera 42 is installed to a rear surface of the vehicle body structure 20 above the rear bumper fascia 24 (see FIGS. 4-6). Further, the passenger's side camera 44 is installed along a side surface of the vehicle body structure 20, such as a side of the roof structure or alternatively to a bottom surface of a side view mirror of the vehicle body structure. The driver's side camera 46 is installed along a side surface of the vehicle body structure 20, such as a side of the roof structure or alternatively to a bottom surface of a side view mirror of the vehicle body structure 20.

As shown in FIG. 1, the front sensor 48 is installed to the front bumper fascia 34 and the driver's side sensor 54 is installed to a bottom surface of the vehicle body structure 20 beneath the driver's side door. The rear sensor 50 and passenger's side sensor 52 are installed to the rear and passenger's side of the vehicle body structure 20, respectively, in similar manners.

Figure 3:
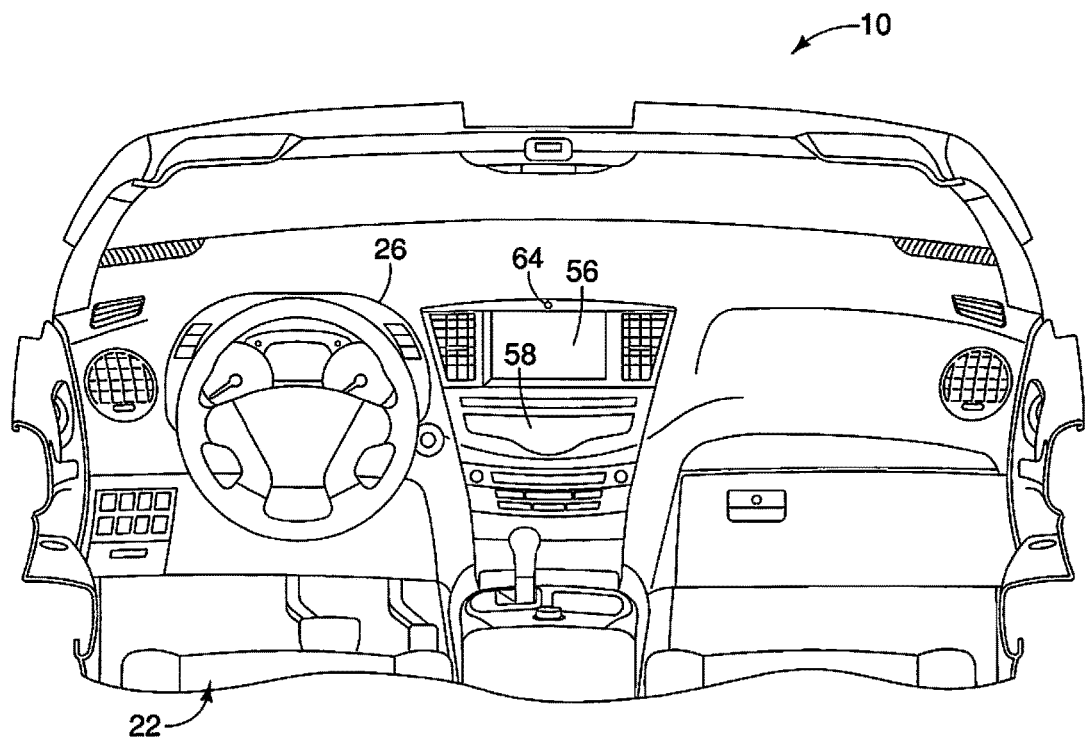
FIG. 3 is an elevational view of an instrument panel within a passenger compartment of the vehicle depicted in FIG. 1, showing the video display and the control panel of the object detection system in accordance with the first embodiment.

As shown in FIG. 3, the instrument panel 26 is located within the passenger compartment 22.

As indicated in FIG. 1, the front camera 40 and the front sensor 48 are aimed at an area $A_1$ forward of the vehicle 10 adjacent to the front bumper fascia 34 in order to view and/or detect objects and the distance to those objects within the area $A_1$ from an outer surface of the front bumper fascia 34. The rear camera 42 and the rear sensor 50 are aimed at an area $A_2$ rearward of the vehicle 10 adjacent to the rear bumper fascia 24 in order to view and/or detect objects within the area $A_2$ and determine/measure the distance between the detected objects and an outer surface of the rear bumper fascia 24. The passenger's side camera 44 and the passenger's side sensor 52 are aimed at an area $A_3$ alongside the vehicle 10 in order to view and/or detect objects within the area $A_3$ and determine/measure the distance between the detected objects and an outer surface of the passenger's side of the vehicle 10. The driver's side camera 46 and the driver's side sensor 54 are aimed at an area $A_4$ alongside the vehicle 10 in order to view and/or detect objects within the area $A_4$ and determine/measure the distance between the detected objects and an outer surface of the driver's side of the vehicle 10.

As shown in FIG. 3, the video display 56 and the control panel 58 are both installed as a part of the instrument panel 26. Alternatively, a video display can be included as part of a rear view mirror assembly or on a window as a head's-up-display.

The object detection system 12 can be operated in a number of differing modes, as is described below. Typically, the object detection system 12 is enabled automatically when the vehicle 10 is in reverse (backing up) and/or parking. However, the vehicle operator can also utilize the control panel 58 to engage the object detection system 12 manually. The object detection system 12 can operate under a variety of circumstances, but is preferably engaged when the vehicle 10 is in reverse (backing up) or moving at a slow rate of speed, for example, under 10 mph. The object detection system 12 operates to perform several functions simultaneously. One function is to detect objects within any one of a plurality of the predetermined areas adjacent to outer surfaces of the vehicle 10. Specifically, the object detection system 12 is configured to detect objects within any of the areas $A_1$, $A_2$, $A_3$ and/or $A_4$. Another function of the object detection system 12 is to determine the actual distance between the objects detected within any of the areas $A_1$, $A_2$, $A_3$ and/or $A_4$ and the adjacent outer surface of the vehicle 10. Yet another function is to measure and provide distance to specific objects that the vehicle operator may be staring at. Once the object detection system 12 detects repeated gaze paths and fixation points, the distance to objects of interest can be temporarily displayed until the current vehicle maneuver is completed. This procedure can reduce unnecessary display changes and minimize confusion and improve usability.

The object detection system 12 described herein can be part of, or an add-on feature to an around view monitoring (AVM) system described in, for example, U.S. Patent Application Publication No. 2010/0238051, published Sep. 23, 2010 (application Ser. No. 12/680,423), U.S. Patent Application Publication No. 2012/0069182, published Mar. 22, 2012 (application Ser. No. 13/232,146), and U.S. Pat. No. 8,243,994, issued Aug. 14, 2012 (application Ser. No. 12/298,837) all commonly assigned to Nissan Motor Co. Ltd. The disclosures of U.S. Patent Application Publication No. 2010/0238051, U.S. Patent Application Publication No. 2012/0069182, and U.S. Pat. No. 8,243,994 are incorporated herein by reference in their entirety.

The object detection system 12 is configured to provide the vehicle operator with object contact avoidance information that the vehicle operator uses to prevent the outer surfaces of the vehicle 10 from making contact with objects adjacent to the vehicle 10. The provided information can be a visual representation of the outer surface 14 with a visual representation of the detected object, and/or an audible signal. The visual representations can be video images and/or computer generated images, as described in greater detail below.

The object detection system 20 is provided with information stored in memory 60 and/or manually inputted with the predetermined dimensions of various surfaces of the vehicle 10 that constitute an outer surface of the vehicle 10. These predetermined dimensions include the dimensions of fenders, door panels, the rear bumper fascia 24, the front bumper fascia 34, and wheels 36 within predetermined tolerances of, for example plus-or-minus one inch (less than three centimeters). These predetermined dimensions also include the precise location of each of the plurality of cameras and each of the plurality of sensors relative to the adjacent outer surfaces of the vehicle 10, within a predetermined tolerance of, for example, less than plus-or-minus one centimeter. As the object detection system 12 detects the proximity of an object, the distance between the object and the approaching respective outer surface 14 of the vehicle 10 is determined and/or measured in a manner that is described below in order to provide a numeric representation of that distance to the vehicle operator.

The front camera 40, the rear camera 42, the passenger's side camera 44 and the driver's side camera 46 (a plurality of cameras) are sensing devices configured to detect the presence of an object and provide object information to the controller 62 that the controller 62 uses to determine the actual distance (within certain tolerances) to the detected object within a prescribed area adjacent to the outer surface 14 of the vehicle body structure 20 as the vehicle body structure approaches the detected object. In the depicted embodiment, the plurality of cameras is mainly used to capture images of the detected object, but can alternatively be used to determine the measured distance to the detected object, as is described further below.

Further, the front sensor 48, the rear sensor 50, the passenger's side sensor 52 and the driver's side sensor 54 (a plurality of sensors) are also sensing devices configured to detect the presence of the object and measure and/or determine the distance between the detected object and adjacent outer surface 14 of the vehicle body structure 20 as the vehicle body structure 20 approaches the detected object. Each of the plurality of sensors is configured to detect the distance between an object and the approaching respective outer surface 14 of the vehicle 10 within a predetermined tolerance of, for example, plus-or-minus one inch (less than three centimeters). However, it should be understood from the drawings and the description herein that the tolerances can be greater or can be less, depending upon the size of the vehicle 10 and the specific type of sensors employed.

The rear sensor 50 can support multiple features of the vehicle 10. For example, the rear sensor 50 can also act as a closure panel actuation sensor when the vehicle is parked. In this example, the vehicle 10 can also include a rear hatch or rear trunk lid (not shown). The rear hatch or rear trunk lid in many vehicles can be opened via use of a sensor beneath the vehicle that detects movement of a person's foot adjacent to the rear of the vehicle 10. The rear sensor 50 can be connected to the latch/opening mechanism of the rear hatch or rear trunk lid for the purpose of detecting movement of a person's foot and opening the rear hatch or trunk lid.

The plurality of cameras and the plurality of sensors provide data (object information) to the controller 62. The controller 62 is configured to process object information received from the plurality of cameras and the plurality of sensors (sensing devices) in order to determine the distance between the detected object and the adjacent outer surface 14, within a relatively small tolerance of, for example, less than plus-or-minus two inches (approximately 12 centimeters). The controller 62 further generates and/or displays images on the video display 56 representing the detected object along with a representation of the actual distance between the object relative and the outer surface 14 of the vehicle 10.

In the first embodiment described below, the plurality of cameras and the plurality of sensors can provide differing types of object information to the controller 62. Specifically, images are provided by the plurality of cameras and detection data is provided by the plurality of sensors. The controller 62 sends both computer generated images and video images to the video display 56. Specifically, the images shown in FIGS. 4-6, 10 and 13-14 are computer generated images or faux images that represent the outer surfaces 14 of the vehicle 10 approaching the detected object along with surfaces that represent the detected object. The computer generated images are updated continuously by the controller 62 as the vehicle 10 moves relative to the detected object. The images shown in FIGS. 7-9 and 11-12, on the other hand, are video images of the detected object(s) captured by the plurality of cameras along with a superimposed representation of the outer surfaces of the vehicle 10.

However, it should be understood from the drawings and the description herein that the object detection system 12 can operate effectively with only the plurality of sensors serving as the sensing devices, as described below with respect to a second embodiment. Similarly, it should be understood from the drawings and the description herein that the object detection system 12 can operate effectively with only the plurality of cameras serving as the sensing devices, as described below with respect to a third embodiment.

In the first embodiment, the plurality of cameras are configured to provide images of the prescribed area(s) (the areas $A_1$, $A_2$, $A_3$ and/or $A_4$) adjacent to the corresponding outer surfaces of the vehicle body structure 20 with a representation of the vehicle 10 superimposed on the video display 56, as indicated in FIGS. 7-9 and 11-12, along with captured images of any objects within the prescribed area(s). Specifically, the front camera 40 captures images of the area $A_1$ adjacent to the front of the vehicle 10. The rear camera 42 captures images of the area $A_2$ adjacent to the rear of the vehicle 10. The passenger's side camera 44 captures images of the area $A_3$ adjacent to the passenger's side of the vehicle 10. The driver's side camera 46 captures images of the area $A_4$ adjacent to the driver's side of the vehicle 10.

In the first embodiment, the plurality of sensors provides object detection information within the prescribed area(s) (the areas $A_1$, $A_2$, $A_3$ and/or $A_4$) adjacent to the corresponding outer surface 14 of the vehicle body structure 20 and also determines and/or measures the distance between the detected object and the adjacent outer surface 14, and provides such information to the controller 62. Specifically, the front sensor 48 captures object information from the area $A_1$ adjacent to the front of the vehicle 10. The rear sensor 50 captures object information from the area $A_2$ adjacent to the rear of the vehicle 10. The passenger's side sensor 52 captures object information from the area $A_3$ adjacent to the passenger's side of the vehicle 10. The driver's side sensor 54 captures object information from the area $A_4$ adjacent to the driver's side of the vehicle 10. It should be understood from the drawings that each of the plurality of cameras can be aimed to capture images from a relatively large area adjacent to the outer surfaces of the vehicle 10. Similarly, the sensitivity and range of operation of each of the plurality of sensors can be set or selected to detect distance to objects within a short distance or a longer distance, depending upon the type of sensor employed. However, the controller 62 is configured to focus object detection and determination of object distance areas that are a limited distance from to the vehicle 10. Specifically, the controller 62 limits object detection to those objects within the confines of the areas $A_1$, $A_2$, $A_3$ and/or $A_4$. The areas $A_1$, $A_2$, $A_3$ and $A_4$ are defined within the controller 62 as areas that extend from the adjacent outer surface of the vehicle 10 no more than, for example, 10 feet away from the adjacent surface of the vehicle 10, but preferably less than 5 feet away from the corresponding outer surface of the vehicle 10. The actual size of each of the areas $A_1$, $A_2$, $A_3$ and/or $A_4$ varies from vehicle to vehicle. For a large vehicle, each of the areas $A_1$, $A_2$, $A_3$ and/or $A_4$ can extend to up to 10 feet away from the vehicle 10. For a small vehicle each of the areas $A_1$, $A_2$, $A_3$ and/or $A_4$ can extend less than five feet from the outer surfaces of the vehicle 10 or less than three feet from the outer surfaces of the vehicle 10.

The images captured by the plurality of cameras in the first embodiment mainly provide visual object location information. Conventional cameras provide a vehicle operator with object location information relative to visible surfaces of the vehicle 10. More specifically, the images captured by the plurality of cameras primarily provide the vehicle operator with an image of the object as the object approaches a respective outermost adjacent surface of the vehicle 10 as the vehicle 10 approaches the object. The controller 62 utilizes the captured images from the plurality of cameras to determine the actual distance. For example, the controller 62 can be configured to calculate the distance between the vehicle surface and the detected objects based upon images captured by the plurality of cameras and/or sensor data, in combination with a detected speed of the vehicle 10. Using observed changes in geometric relationships between surfaces of detected objects, in combination with known distances traveled (based on speed), the distance between an object and the outer surface 14 can be determined by the controller 62, even in a situation in which the object is no longer within the field of view of the cameras or the range of the sensors.

The plurality of cameras (the front camera 40, the rear camera 42, the passenger's side camera 44 and the driver's side camera 46) includes conventional video cameras that capture images and indications of relative movement of objects within each camera's field of vision and transmit those images to the controller 62. Since video cameras are conventional devices, further description is omitted for the sake of brevity.

The plurality of sensors (the front sensor 48, the rear sensor 50, the passenger's side sensor 52 and the driver's side sensor 54) can be any of a plurality of differing types of sensors often referred to as detection and ranging sensors or devices. Specifically, each of the plurality of sensors includes an emitting section (not shown) and a detecting section (not shown). The emitting section emits a prescribed signal and the detecting section detects returning signals that are reflected back from surfaces of nearby objects. For example, each of the plurality of sensors can be a sonar emitting and detecting device, a radar emitting and detecting device, an infrared emitting and detecting device and/or a laser light emitting and light detecting device (i.e., LIDAR). Since detection and ranging sensors are conventional devices, further description is omitted for the sake of brevity. In the first embodiment, the distance between the detected object and the respective adjacent outer surface 14 of the vehicle 10 is determined by the controller 62 using object information detected by the plurality of sensors.

Figure 15:
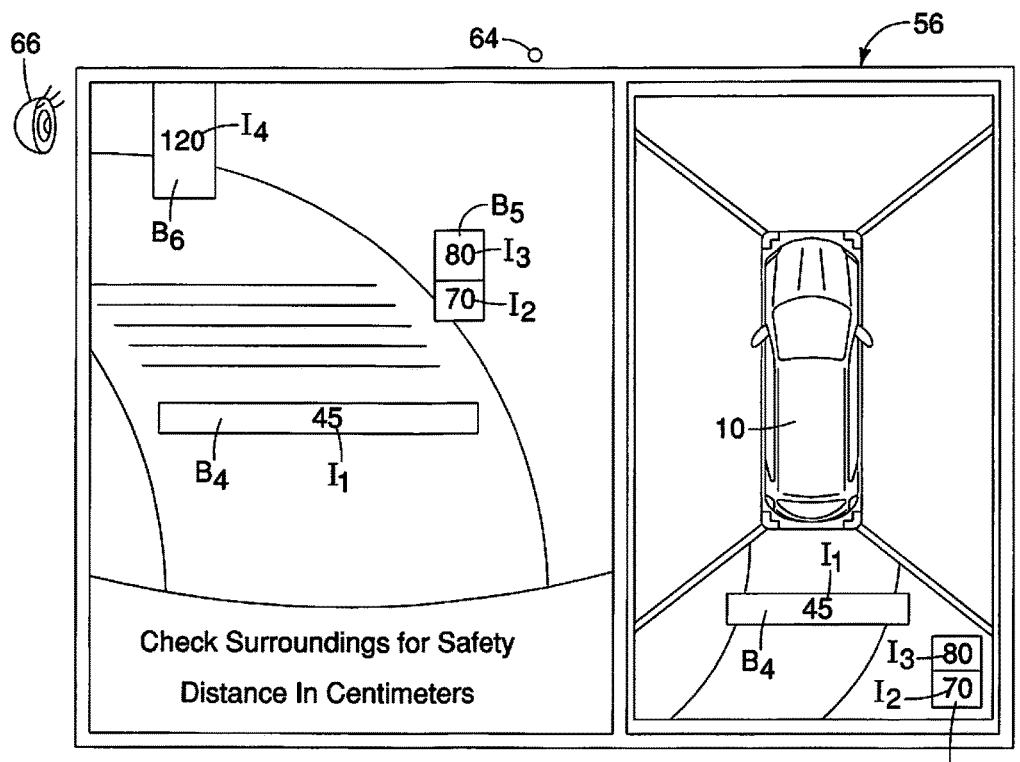
FIG. 15 is a representation of the video display with the object detection system displaying in a backup view mode showing a captured image of an area rearward of the vehicle with several objects detected and showing an indication of the distance between the objects and the respective rear surfaces of the vehicle in accordance with the first embodiment.
Figure 16:
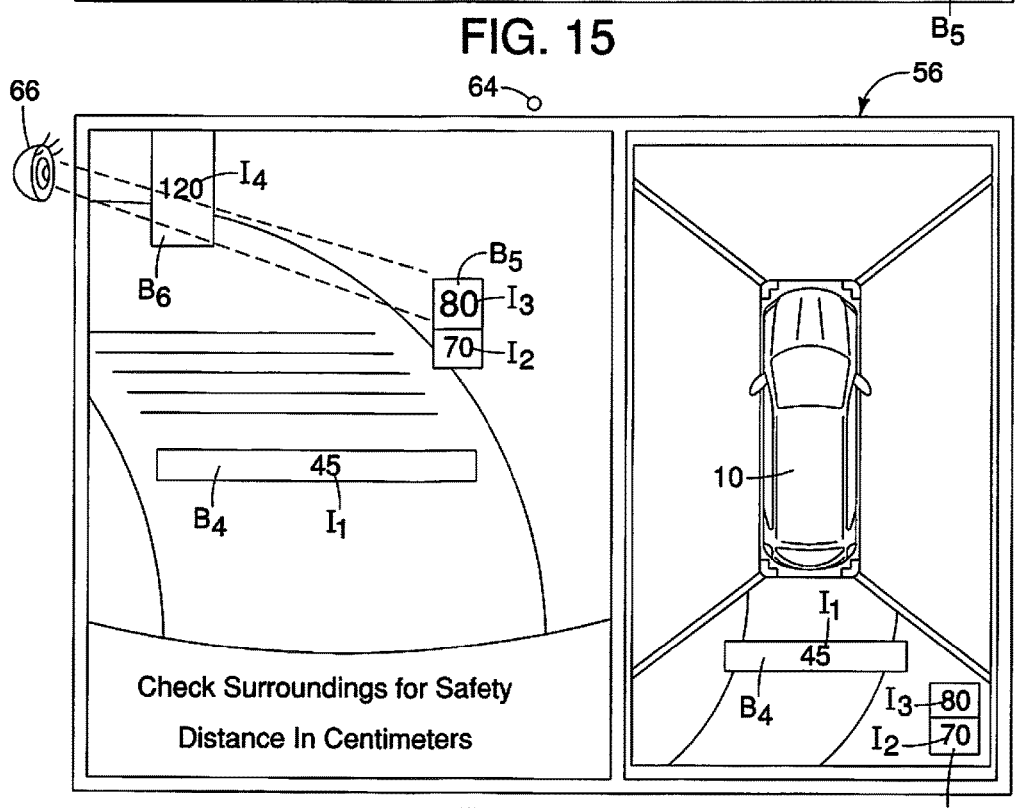
FIG. 16 is another representation of the video display with the object detection system displaying in the backup view mode showing the captured image of the area rearward of the vehicle with the several objects detected and showing an indication of the distance between the objects and the respective rear surfaces of the vehicle, and further showing a vehicle operator's eye movement being detected focusing on one of the objects in accordance with the first embodiment.

The eye gaze camera 64 of the object detection system 12 is part of an eye movement detecting feature of the controller 62. Specifically, the eye gaze camera 64 is aimed to observe the movement and focus of the vehicle operator's eye 66, as shown in FIGS. 15 and 16. As explained further below with reference to FIGS. 15 and 16, as the vehicle operator's eye 66 focuses on different objects displayed on the video display 56, the eye gaze camera 64 observes that movement and focus. The controller 62 processes this information and determines which objects the eye 66 is focusing on. That determination is used to augment the images displayed on the video display 56, as described below with reference to FIGS. 15 and 16. Further information concerning the operation of the controller 62 when utilizing the eye gaze camera 64 and determinations with respect to movement of the vehicle operator's eye 66 is included in U.S. Pat. No. 5,604,818, issued Feb. 18, 1997 and assigned to Nissan Motor Co., Ltd. The disclosure of U.S. Pat. No. 5,604,818 is incorporated herein in its entirety.

The controller 62 is configured to display object information on the video display 56 in a plurality of differing formats. For example, the controller 62 and video display 56 can operate in at least a side view mode (FIGS. 4-6 and 10), an around view monitor mode (AVM mode) (FIGS. 7-9 and 11-12), a parallel parking view mode (FIGS. 13-14) and a backup mode (FIGS. 15-16). In the description below for operation in the side view mode, the backup mode and the AVM mode, the outer surface 14 of the vehicle is a rear surface, of the rear bumper fascia 24 as the rear bumper fascia 24 of the vehicle 10 is moved toward an object $B_1$. This description is equally applicable to a maneuver where the front bumper fascia 34 of the vehicle 10 is moved toward another object (not shown). In other words, the object detection system 12 operates exactly the same with reference to objects at the front of the vehicle 10 and with reference to objects at the rear of or beside the vehicle 10.

Figure 4:
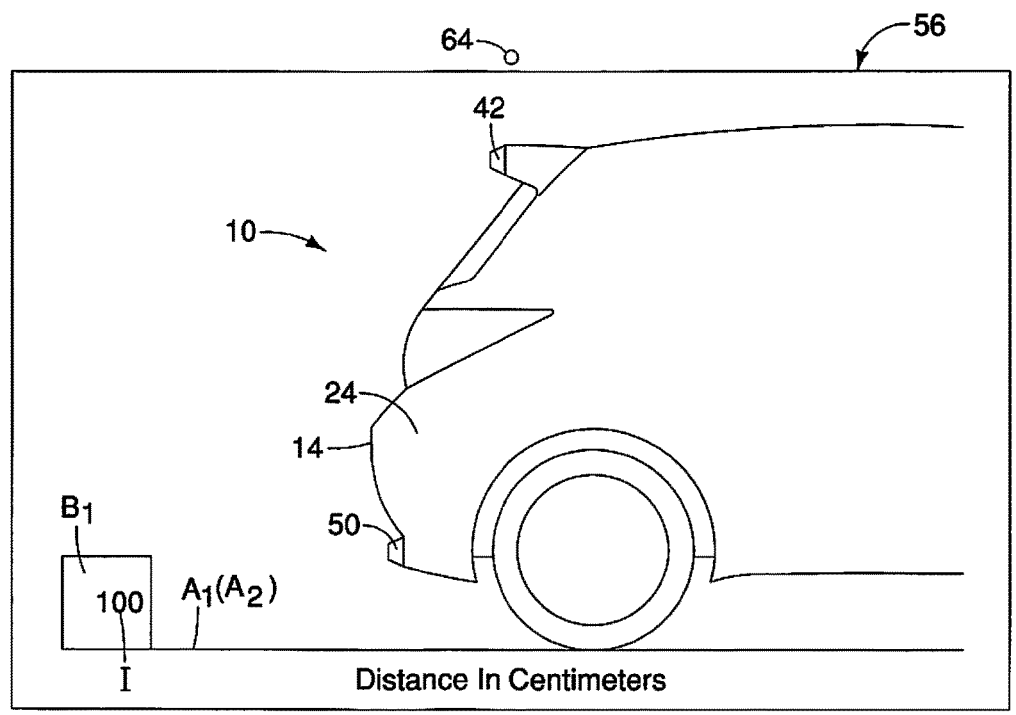
FIG. 4 is a representation of the video display with the object detection system displaying in a side view mode showing a representation of an outer surface of the vehicle, a representation of an object as detected by the object detection system and a first determined distance between the object and the outer surface of the vehicle in accordance with the first embodiment.
Figure 5:
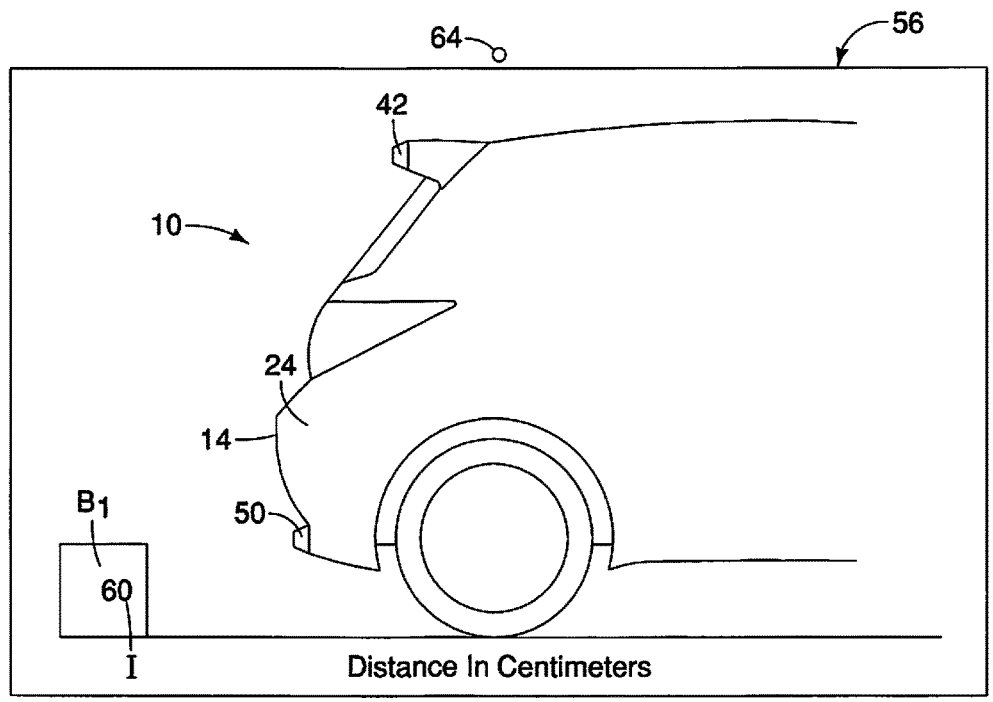
FIG. 5 is a second representation of the video display in the side view mode showing the representation of the outer surface of the vehicle, another representation of the object detected by the object detection system and a second determined distance between the object and the outer surface of the vehicle in accordance with the first embodiment.
Figure 6:
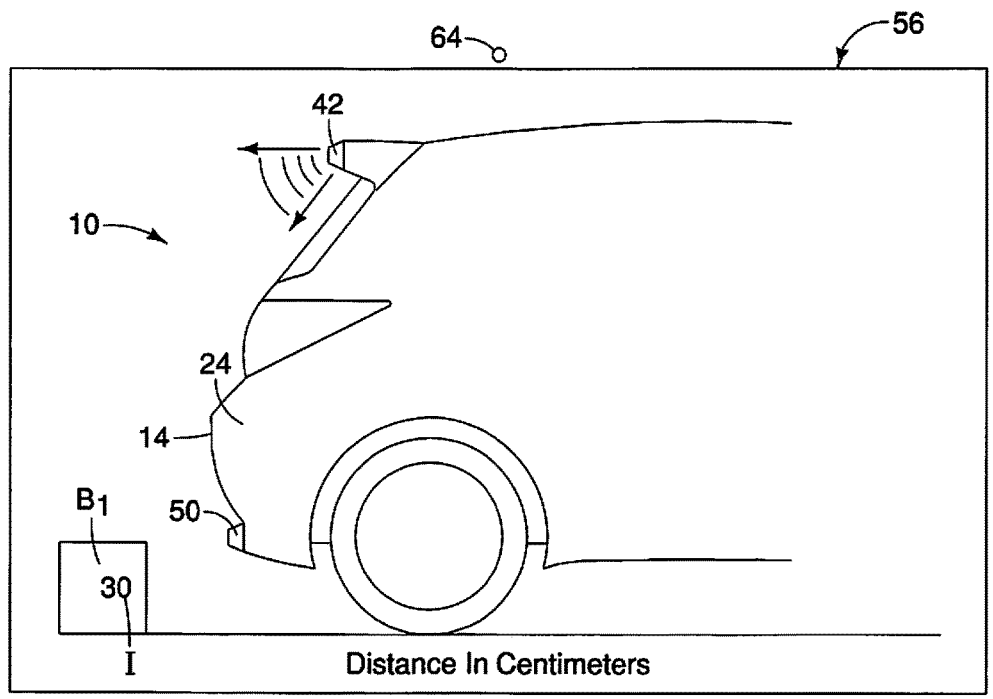
FIG. 6 is a third representation of the video display in the side view mode showing the representation of the outer surface of the vehicle, yet another representation of the object detected by the object detection system and a third determined distance between the object and the outer surface of the vehicle in accordance with the first embodiment.

The operation of the controller 62 and the video display 56 in the side view mode is demonstrated in FIGS. 4-6. Specifically, FIG. 4 is a depiction of images shown on the video display 56 generated by the controller 62 based upon object information from the rear camera 42 and/or object information from the rear sensor 50. The video display 56 shows a computer generated representation of an outer surface 14 (the rearmost surface) of the rear bumper facia 24 of the vehicle 10 and a computer generated image of the detected object, the object $B_1$. The video display 56 also shows a computer generated representation of a first measured distance between the outer surface 14 and the object $B_1$. In the depiction in FIG. 4, the controller 62 determines from the rear sensor 50 and the rear camera 42 that the first measured distance is 100 cm between the detected object $B_1$ and the respective outer surface 14 of the vehicle. The controller 62 displays the first measured distance as superimposed indicia I on the video display 56, positioned adjacent the closest surface of the object $B_1$.

As the vehicle 10 moves closer to the object $B_1$, the controller 62 obtains updated information from both the rear camera 42 and the rear sensor 50, and updates the video display 56 accordingly. More specifically, the controller 62 continuously receives updated object information from the rear camera 42 and the rear sensor 50 and produces updated computer generated images, as shown in FIG. 5. Specifically, FIG. 5 is another representation of the video display 56 showing the object $B_1$ a second measured distance away from the outer surface 14 of vehicle 10, closer than the first measured distance shown in FIG. 4. In the depiction in FIG. 5, the second measured distance is 60 cm and is displayed as the superimposed indicia I on the video display 56.

As the vehicle 10 continues to move closer to the object $B_1$, the controller 62 further updates the video display 56 based on the continuously received object information from the rear camera 42 and the rear sensor 50, as shown in FIG. 6. FIG. 6 is yet another representation of the video display 56 showing the object $B_1$ a third measured distance away from the vehicle 10, closer than the first and second measured distances shown in FIGS. 4 and 5. In the depiction in FIG. 6, the third measured distance is 30 cm and is displayed as the superimposed indicia I on the video display 56.

The controller 62 is further configured to generate an audible alarm for the benefit of the vehicle operator in response to the controller 62 determining that the outer surface 14 is less than a predetermined distance away from the object $B_1$. For example, the predetermined distance can be one meter, fifty centimeters, twenty five centimeters or a manually entered amount set by the vehicle operator via the control panel 58. Further, if the vehicle 10 is equipped with a collision avoidance system and that system is activated, the controller 62 can use the above information to slow or stop the vehicle 10.

Figure 7:
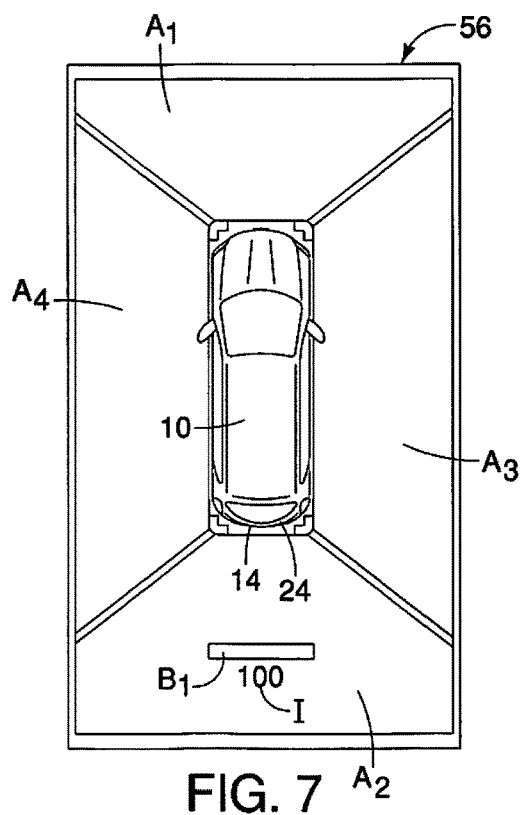
FIG. 7 is a representation of the video display in an around view monitor mode (AVM mode) showing a representation of front, rear, driver's side and passenger side surfaces, with indications of the areas adjacent to the front, rear, driver's side and passenger side surfaces as viewed by the plurality of cameras mounted to the vehicle and further showing a captured image of the object detected by the object detection system along with the first determined distance between the object and the adjacent outer surface of the vehicle in accordance with the first embodiment.
Figure 8:
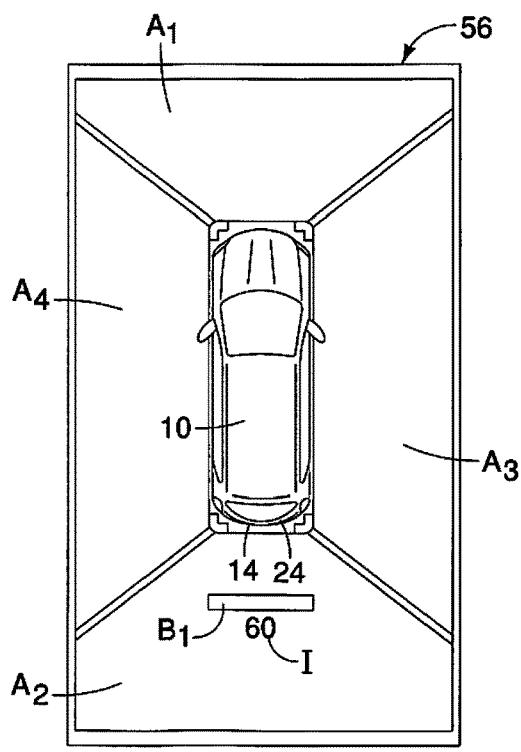
FIG. 8 is a further representation of the video display in the around view monitor mode (AVM mode) showing the representation of front, rear, driver's side and passenger side surfaces, with indications of the areas adjacent to the front, rear, driver's side and passenger side surfaces as viewed by the plurality of cameras and further showing another captured image of the object detected by the object detection system along with the second determined distance between the object and the adjacent outer surface of the vehicle in accordance with the first embodiment.
Figure 9:
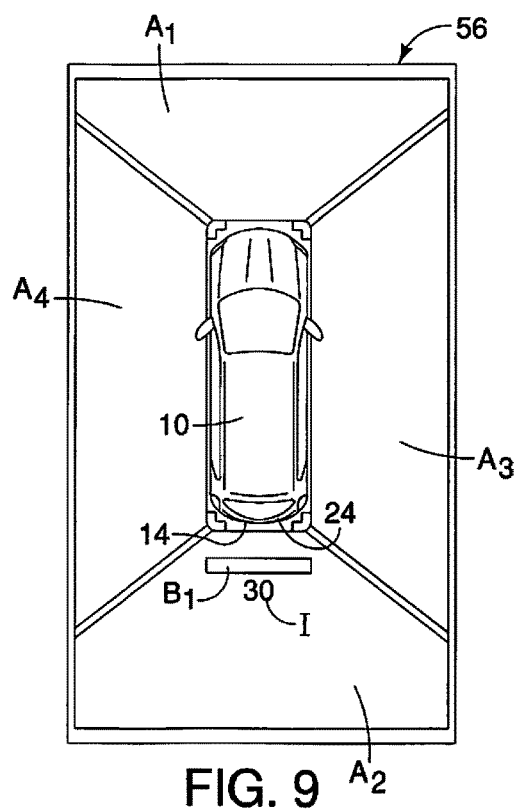
FIG. 9 is another representation of the video display in the around view monitor mode (AVM mode) showing the representation of front, rear, driver's side and passenger side surfaces, with indications of the areas adjacent to the front, rear, driver's side and passenger side surfaces as viewed by the plurality of cameras and further showing yet another captured image of the object detected by the object detection system along with the third determined distance between the object and the adjacent outer surface of the vehicle in accordance with the first embodiment.

The operation of the controller 62 and video display 56 in the AVM mode is demonstrated in FIGS. 7-9. The video display 56 can display images from the side view mode and the AVM mode view at the same time. However in the depicted embodiment, they are separately shown for the sake of simplicity. FIGS. 7-9 only show the depiction of operation in the AVM mode. The AVM mode displays captured images from each of the plurality of cameras, and manipulates those images in order to provide a simulation of an overhead view of the vehicle 10. Each of the plurality of cameras captures images of a corresponding one of the areas $A_1$, $A_2$, $A_3$ and $A_4$ adjacent to corresponding outer surfaces of the vehicle 10. The captured images of the areas $A_1$, $A_2$, $A_3$ and $A_4$ shown in the AVM mode only capture images of those objects that are within a predetermined distance of the corresponding outer surface of the vehicle 10 due to the physical limitations of the corresponding camera and its placement on the vehicle 10. The predetermined distance varies from vehicle-to-vehicle. For example, in a large vehicle, such as a large pickup truck, each of the plurality of cameras is higher above the ground than in a small vehicle. Hence, the areas $A_1$, $A_2$, $A_3$ and $A_4$ can encompass areas that are as much as 10 feet from each corresponding side of the vehicle 10. However, in a smaller vehicle, such as a compact car, the areas $A_1$, $A_2$, $A_3$ and $A_4$ can encompass areas that are as little as 3 feet from each corresponding side of the vehicle 10. Alternatively, each of the plurality of cameras can be mounted on a gimbal that allows movement of the camera thereby increasing the viewing area. Further, each of the plurality of cameras can include binocular cameras that can further modify and enhance the images captured.

FIG. 7 is a depiction of the video display 56 in the AVM mode just after the controller 62 has detected the object $B_1$ at the first measured distance from the outer surface 14 (the rearmost surface of the rear bumper fascia 24). The images shown on the video display 56 are video images captured by the rear camera 42 and transmitted to the controller 62. The controller 62 can additionally supplement the captured images by adding further object information from the rear sensor 50, as described below. The video display 56 shows video images of the object $B_1$, along with a representation of a portion or the entire vehicle 10. Further, the video display 56 also shows the object $B_1$ detected at the first measured distance away from the outer surface 14 of the vehicle 10. In the depiction in FIG. 7, the first measured distance is determined to be 100 cm and is displayed on the video display 56 as the superimposed indicia I in a manner corresponding to FIG. 4.

As the vehicle 10 moves closer to the object $B_1$, the controller 62 updates the video display 56 based on the continuously received object information from the rear camera 42 and the rear sensor 50, as shown in FIG. 8. Specifically, FIG. 8 is another representation of the video display 56 showing the object $B_1$, the second measured distance away from the outer surface 14 of the vehicle 10, closer than the first measured distance shown in FIG. 7. In the depiction in FIG. 8, the second measured distance is 60 cm and is displayed as the superimposed indicia I on the video display 56.

As the vehicle 10 continues to move closer to the object $B_1$, the controller 62 further updates the video display 56 based on the continuously provided object information from the rear camera 42 and the rear sensor 50, as shown in FIG. 9. In the depiction in FIG. 9, the third measured distance is 30 cm and is displayed as superimposed indicia I on the video display 56.

With the controller 62 continuously updating a visual numeric indication of the actual distance between the object $B_1$ and the outer surface 14 of the vehicle 10, the vehicle operator can make an informed decision and can decide whether or not to continue movement toward the object $B_1$.

Figure 13:
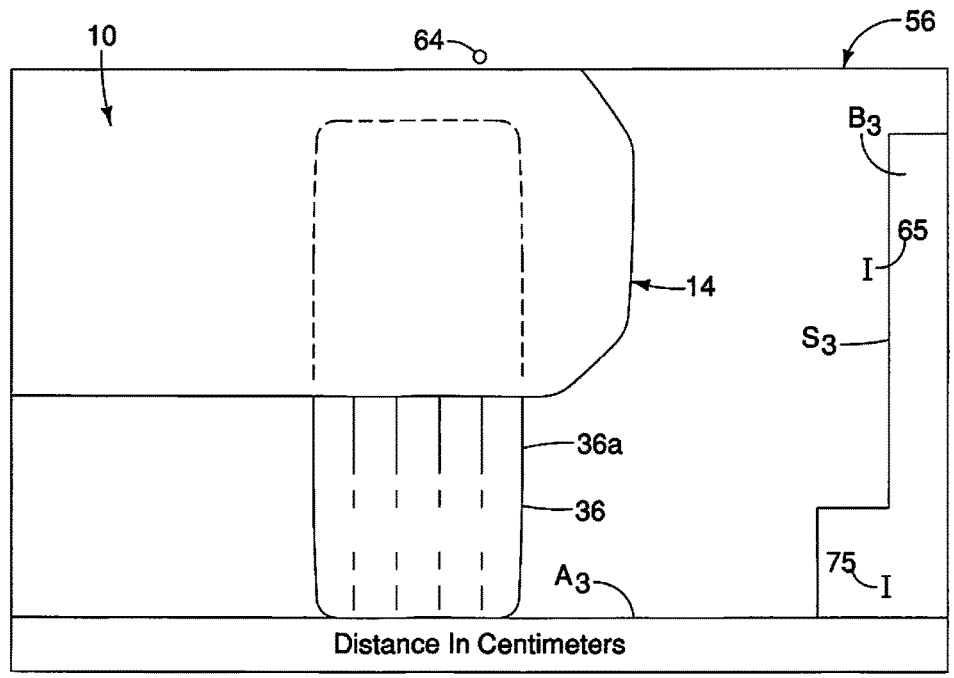
FIG. 13 is a representation of the video display with the object detection system displaying in a parallel parking view mode showing a representation of outer surfaces of the vehicle, including an outer side surface of the vehicle body structure and an outer surface of the tire of the vehicle, along with a representation of two surfaces of an object detected adjacent to the respective outer surfaces of the vehicle and further showing indications of two detected distances, the first distance being between a first surface of the object and the outer side surface of the vehicle and the second distance being between the object and the outer surface of the tire of the vehicle in accordance with the first embodiment.
Figure 14:
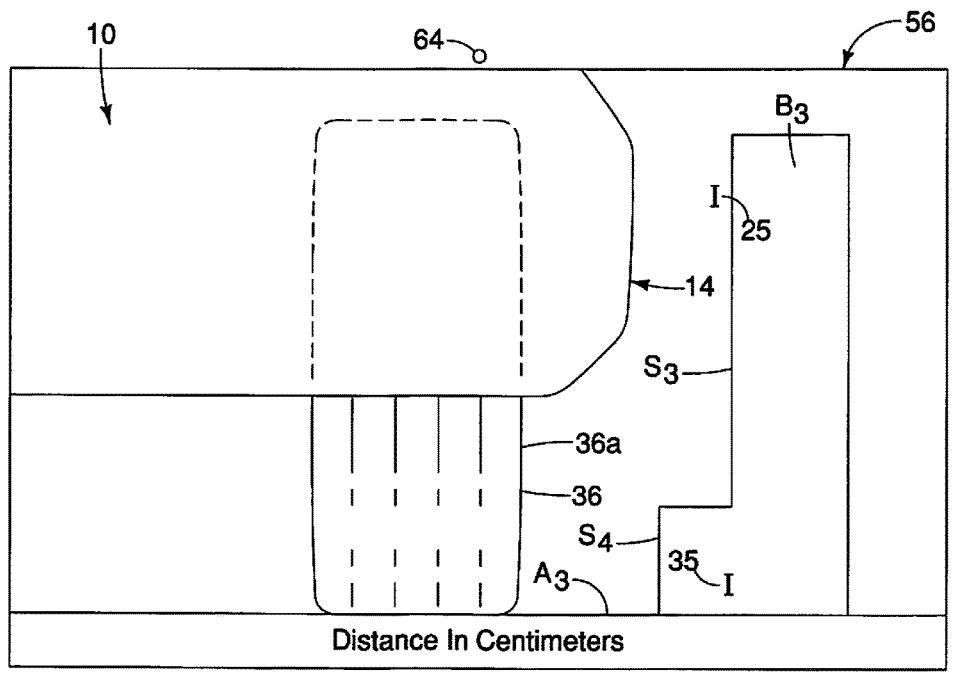
FIG. 14 is another representation of the video display with the object detection system displaying in the parallel parking view mode showing the representation of the outer surfaces of the vehicle along with a further representation of the two surfaces of the object detected adjacent to the respective outer surfaces of the vehicle and further showing updated indications of two detected distances, the first distance being between the first surface of the object and the outer side surface of the vehicle body structure and the second distance being between the object and the outer surface of the tire of the vehicle in accordance with the first embodiment.

The controller 62 can additionally provide warnings in the form of differing colorings of the superimposed indicia I in the side view mode (FIGS. 4-6), the AVM view mode (FIG. 7-9), the backup view mode (FIGS. 15-16) and the parallel parking view mode (FIGS. 13-14). Specifically, as the vehicle 10 moves toward the object $B_1$, the controller 62 can utilize several critical predetermined distances. For example, when the object $B_1$ is first detected by the controller 62 within the prescribed area (i.e., area $A_2$), the superimposed indicia I can be shown in a first color such as the color green. Once the object $B_1$ is less than a first critical distance from the outer surface 14, but appreciably distanced from the vehicle 10, the controller 62 can display, for example, superimposed indicia I in a second color, such as yellow, as a warning to the vehicle operator that the vehicle 10 is approaching the object $B_1$. Once the object $B_1$ is less than a second critical distance from the outer surface 14 (but much closer than the first critical distance), the controller 62 can display the superimposed indicia I in a third color, such as red, as a warning to the vehicle operator that the vehicle 10 is approaching and may contact the object $B_1$. Further, if the controller 62 detects that the object $B_1$ is closer than the second critical distance, the controller 62 can display the superimposed indicia I in the third color (red) but further cause the superimposed indicia I to blink or flash on and off as a warning to the vehicle operator that the object $B_1$ will contact the outer surface 14 if the vehicle 10 continues to move.

Further, the controller 62 can be programmed to provide a first audible warning signal when the object is a first distance away from an outermost outboard surface of the vehicle 10. As the vehicle 10 moves closer to the object $B_1$, the controller 62 can issue a second audible warning, different from the first warning. Further, when the object $B_1$ approaches the outer surface 14 of the vehicle 10, the controller 62 can issue a third audible warning different from the first and second audible warnings to provide the vehicle operator with adequate warnings of the proximity of the object $B_1$ to the outer surface 14 of the vehicle 10.

In other words, the controller 62 is configured to determine whether or not the object $B_1$ is at a distance where it is likely to come into contact with the outer surface 14 of the vehicle 10 adjacent to the object $B_1$ and can issue a plurality of differing types of warnings to the vehicle operator.

It should be understood from the above description that the controller 62 monitors the output of each of the plurality of sensors and the plurality of cameras. Therefore, the above object detection and distance measurement between of the object $B_1$ and the outer surface 14 of the vehicle 10, and the images produced by the controller 62 on the video display 56 applies equally to objects detected in any of the areas $A_1$, $A_2$, $A_3$ and $A_4$ and possible contact between the detected object and a corresponding outer surface of the vehicle 10 located at a corresponding one of the front, passenger's side and/or driver's side of the vehicle 10.

In FIGS. 4-6 and 7-9, the object $B_1$ had a geometrically simple shape, such as a rectangle. More specifically, the object $B_1$ is, for example, a concrete barrier in a parking lot commonly known as a parking stop. A vehicle parking in a parking space with a parking stop typically approaches the parking stop slowly until the wheels of the vehicle contact the parking stop. The object detection system 12 provides the vehicle operator with a numeric visual representation of the actual distance to an object and informs the vehicle operator as to whether or not the object and the outer surface 14 of the vehicle 10 might contact one another. Further, the controller 62 can additionally add highlighting to the surface of the object $B_1$, in order to highlight the actual surface of the object $B_1$ that may be of concern to the vehicle operator.

Figure 10:
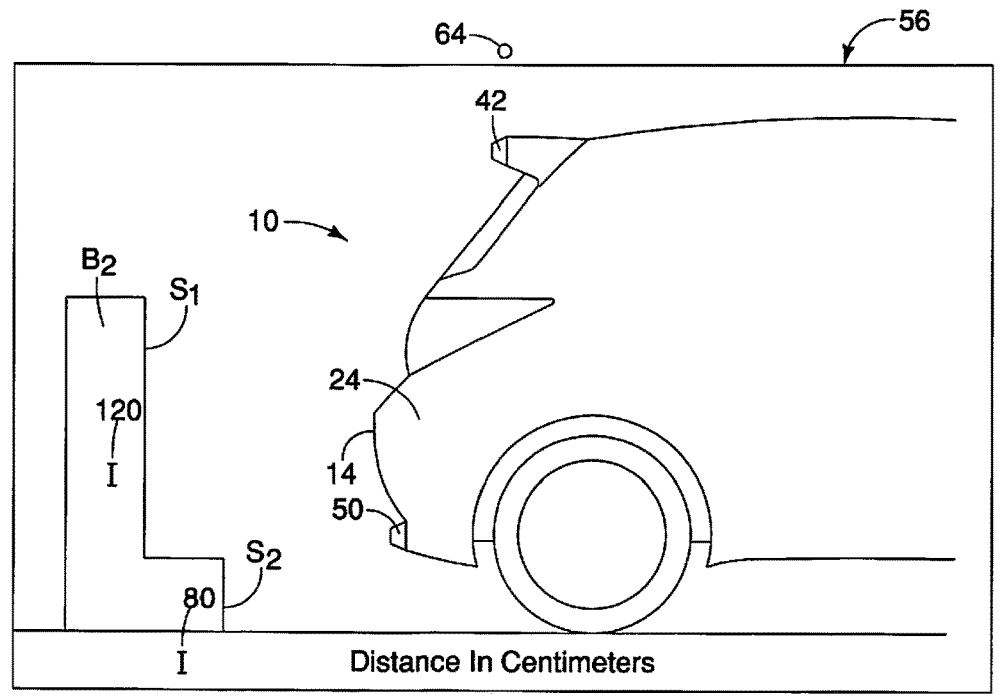
FIG. 10 is a representation of the portion of the video display similar to FIG. 4 with the object detection system displaying in the side view mode showing a representation of a second object to the rear of the vehicle, the second object having at least two surfaces that are differing distances away from an adjacent outer surface of the vehicle, the video display further displaying indications of two determined distances, one determined distance from each of the two surfaces of the second object as the vehicle moves closer to the second object in accordance with the first embodiment.

However, there are many differently shaped objects that can cause a vehicle operator concern when parking or maneuvering the vehicle 10 in a confined space. For example, in FIG. 10 an object $B_2$ has an irregular shape. In FIG. 10, the object $B_2$ represents an obstacle such as, for example, a boulder, a pile of plowed packed snow or a concrete barrier that the vehicle operator will want to observe while operating the vehicle 10. The object detection system 12 can determine the actual distances between outer surfaces 14 of the vehicle 10 and several respective surfaces of the object $B_2$ relative to the vehicle 10 and can additionally display the measured distances as the superimposed indicia I on the video display 56.

The object $B_2$ shown in FIG. 10 has at least two surfaces that could possibly contact respective outer surfaces 14 of the vehicle 10 as the vehicle 10 approaches the object $B_2$. The object detection system 12 uses the object information from either or both the rear camera 42 and the rear sensor 50 to measure a first distance and a second distance. The first distance of 120 cm (in FIG. 10) is measured between a surface $S_1$ of the object $B_2$ and a first respective outer surface 14 of the vehicle 10 (the rearmost surface of the rear bumper fascia 24) that is aligned and closest with the surface $S_1$ of the object $B_2$. The second distance of 80 cm (in FIG. 10) is measured between a surface $S_2$ of the object $B_2$ and a second respective outer surface 14 below the first outer surface 14 of the vehicle 10 (a lower surface of the rear bumper fascia 24) that is aligned and closest with the surface $S_2$ of the object $B_2$. Both distances are displayed by the controller 62 as superimposed indicia I on the video display 56 as shown in FIG. 10.

As the vehicle 10 moves closer to the object $B_2$, the first and second distances are updated by the controller 62 in response to the object information captured by the rear camera 42 and the rear sensor 50. Appropriate visual and audio warnings are provided by the controller 62 once the object $B_2$ is measured to be within the above described predetermined distances.

Figure 11:
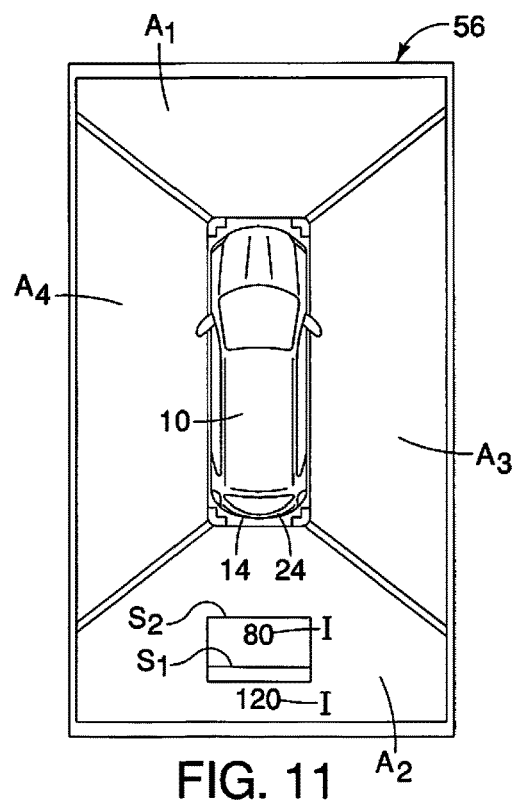
FIG. 11 is a representation of the portion of the video display similar to FIGS. 7-9 with the object detection system displaying in the AVM mode showing a captured image of the second object to the rear of the vehicle, the second object having at least two surfaces that are differing distances away from respective adjacent outer surfaces of the vehicle, the video display further displaying indications of two determined distances, one determined distance from each of the two surfaces of the second object as the vehicle moves closer to the second object in accordance with the first embodiment.

The object $B_2$ is shown in FIG. 11 and is displayed on the video display 56 with the controller 62 and the video display 56 operating in the AVM mode. The object $B_2$ is shown as an image captured by the rear camera 42. Additionally, if the object $B_2$ has an irregular shape (not shown), the controller 62 can generate planar or linear representations of the surface $S_1$ and the surface $S_2$ of the object $B_2$ and superimpose those images on the video display 56. Such lines can be tangent lines that are displayed on the video display 56 corresponding to the object $B_2$ at distances relative to the images representing the vehicle 10.

By viewing both the side view mode and the AVM mode representations of the captured object information, the vehicle operator can determine how close the vehicle 10 can be moved toward the object $B_2$ without any of the outer surfaces 14 contacting the surface $S_1$ and the surface $S_2$ of the object $B_2$.

Figure 12:
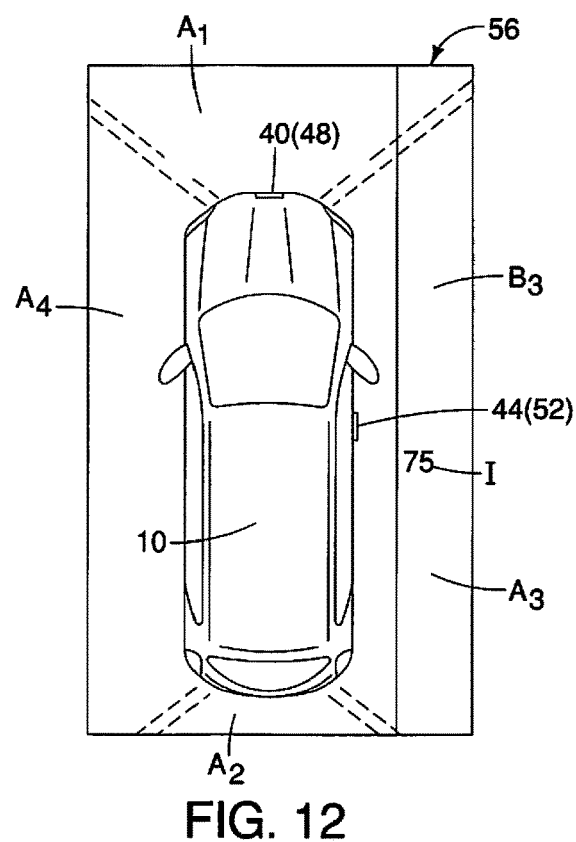
FIG. 12 is a representation of the video display with the object detection system displaying in the AVM view mode showing a captured image of a curb or object detected at one lateral side of the vehicle and showing a representation of a side surface of the vehicle and an indication of the distance between the curb and the side surface of the vehicle in accordance with the first embodiment.

FIGS. 12, 13 and 14 represent a circumstance where the object detection system 12 detects an object $B_3$ in an area adjacent to one side of the vehicle 10. The description relating to FIGS. 12-14 is with respect to the area $A_3$ as monitored by the passenger's side camera 44 and the passenger's side sensor 52. However, the description applies equally to the area $A_4$ as monitored by the driver's side camera 46 and the driver's side sensor 54.

In FIG. 12, the controller 62 is operating in the AVM viewing mode and has generated images representing the object $B_3$. The object $B_3$ is, for example, a curb at the side of a city street and FIGS. 13 and 14 represent images generated in a parallel parking mode to give an indication of maneuvers relating to parallel parking. The object $B_3$ has a plurality of surfaces, such as surfaces $S_3$ and $S_4$. Of concern is potential contact with the outer surface 14 of the vehicle 10 and contact with the surface 36a of the tire 36.

In FIG. 13, the controller 62 is operating in the parallel parking mode. Specifically, the controller 62 has processed information from the camera 44 and the sensor 52 and determined the distance between the outer surface 14 and the surface $S_3$ to be 65 cm and displayed the distance as the superimposed indicia I on the video display 56. Simultaneously, the controller 62 has processed information from the camera 44 and the sensor 52 and determined the distance between the surface 36a of the tire 36 and the surface $S_4$ to be 75 cm and displayed the distance as the superimposed indicia I on the video display 56.

In FIG. 14, the vehicle 10 has moved closer to the object $B_3$. The controller 62 has processed information from the camera 44 and the sensor 52 and determined the distance between the outer surface 14 and the surface $S_3$ as 25 cm and displayed the updated distance as the superimposed indicia I on the video display 56. Simultaneously, the controller 62 has processed information from the camera 44 and the sensor 52 and determined the updated distance between the surface 36a of the tire 36 and the surface $S_4$ to be 35 cm and displayed the determined distance as the superimposed indicia I on the video display 56.

The visual and audio warnings described above with reference to the proximity of the objects $B_1$ and $B_2$ equally apply to the detection of the object $B_3$ regardless of which side of the vehicle 10 the object $B_3$ is on.

A description is now provided for operation in the backup mode with specific reference to FIGS. 15 and 16. FIGS. 15 and 16 show the video display 56 being operated by the controller 62 with a split screen. The right side of the screen is the above described AVM mode. The left side of the video display 56 is the backup mode view with captured images from the rear camera 42. Since the left side of the video display 56 in FIGS. 15 and 16 displays captured rear views, the left side of the video display 56 is altered to be shown as a mirror image of the actual images captured by the camera 42. Thus the left side of the video display 56 conforms to the view the vehicle operator would see if looking at a rear view mirror. Distances to detected objects have been determined by the controller 62 using object information obtained by the rear sensor 50.

In FIGS. 15 and 16, the rear camera 42 has captured images of three different objects $B_4$, $B_5$ and $B_6$. The controller 62 has determined the distance between each object and the rear of the vehicle 10, as indicated by the superimposed indicia $I_1$, $I_2$, $I_3$ and $I_4$ overlaid on corresponding surfaces of the objects. Specifically, the object $B_4$ is a first distance away as indicated by the superimposed indicia $I_1$. The object $B_5$ has two detected surfaces, the first surface being a second distance away as indicated by the superimposed indicia $I_2$ and the second surface being a third distance away as indicated by the superimposed indicia $I_3$. The object $B_6$ is a fourth distance away as indicated by the superimposed indicia $I_4$.

In FIG. 15, the eye gaze camera 64 of the object detection system 12 observes and captures images of the vehicle operator's eye 66. The controller 62 processes the captured images and correlates the aim of the eye 66 with the object the eye 66 is focusing on. In the depicted example, the eye 66 is focused on the object $B_5$ and in particular on the surface that is 80 cm away, as indicated by the superimposed indicia $I_3$. The controller 62 then alters the backup view in FIG. 16 such that the superimposed indicia $I_3$ on the object $B_5$ is augmented by, for example, highlighting, and possibly enlarging the superimposed indicia $I_3$, while the other superimposed indicia $I_1$, $I_2$ and $I_4$ are unchanged or dimmed by displaying them in a less noticeable color, such as grey. The augmentation of the superimposed indicia $I_3$ makes it easier for the vehicle operator to monitor the changes in the superimposed indicia $I_3$ as the corresponding distance is updated by the controller 62 while also observing the view displayed by the video display 56. Alternatively, augmentation of the superimposed indicia $I_3$ on the object $B_5$ can include leaving the superimposed indicia $I_3$ unchanged, while the other superimposed indicia $I_1$, $I_2$ and $I_4$ are diminished by displaying them in a less noticeable color, or even removing them from the display.

The object detection system 12 may also augment several of the superimposed indicia within a predetermined distance of the aim of the eye 66. For instance, when the eye 66 is focused on the object $B_5$ as in the depicted example, both superimposed indicia $I_2$ and $I_3$ can be augmented, since they are displayed within close proximity of each other and within a predetermined distance of the detected focus of the eye 66, while the other superimposed indicia $I_1$ and $I_4$ can remain unchanged or become diminished.

Figure 17:
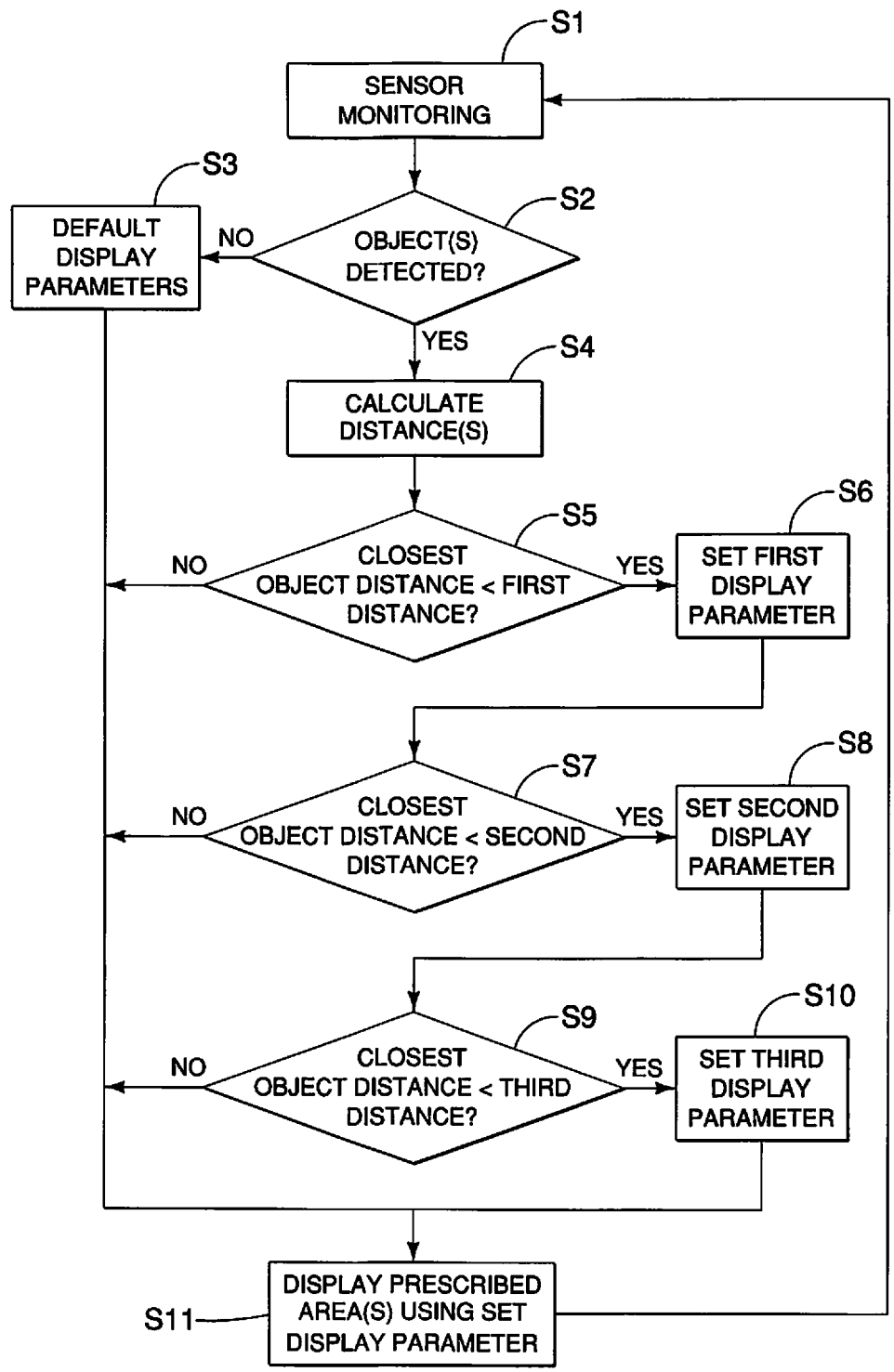
FIG. 17 is a flowchart representing basic operational steps of the object detection system in accordance with the first embodiment.

A description is now provided for the flowchart depicted in FIG. 17, which outlines the basic operation of the controller 62. At step S1, the controller 62 is engaged to monitor the object information and check operator inputted parameters. The object information is provided by one or more of the plurality of cameras (the front camera 40, the rear camera 42, the passenger's side camera 44 and the driver's side camera 46) and one or more of the plurality of sensors (the front sensor 48, the rear sensor 50, the passenger's side sensor 52 and the driver's side sensor 54). The operator inputted parameters are described below.

The controller 62 typically engages the object detection system 12 automatically when the vehicle operator operates the vehicle 10 in reverse or at slow speeds (under 10 mph). In other words, the controller 62 is configured to automatically detect when the vehicle 10 is being operated for delicate maneuvers, such as parking, or maneuvering in a confined space, such as a driveway or parking garage.

Alternatively, the vehicle operator can manually select that one or all of the plurality of cameras and a corresponding one or more of the plurality of sensors be activated via input using the control panel 58. If the vehicle 10 is being operated to park the vehicle 10 moving in a forward direction, the vehicle operator can engage only the front camera 40 and only the front sensor 48 to monitor the area $A_1$ at the front of the vehicle 10 to detect objects such as the object $B_1$. If the vehicle operator has selected the side view mode of operation, only images such as those shown in FIGS. 4-6 are generated by the controller 62 to provide object detection for the benefit of the vehicle operator. However, if the vehicle operator has selected the AVM mode of operation, the controller 62 generates a combination of video images and computer generated images such as those shown in FIGS. 7-9, 11-12 and 15-16 based on images captured by all of the plurality of cameras and object information detected by all of the plurality of sensors. If the vehicle operator has selected the parallel parking mode, only images similar to that represented in FIGS. 13-14 are shown. Specifically, in the parallel parking view mode, one or both of the passenger's side of the vehicle (area $A_3$) and the driver's side of the vehicle 10 (area $A_4$) are monitored thereby generating images on the video display 56 similar to the view shown in FIGS. 13 and 14. If the vehicle 10 includes an automatic parking feature, the controller 62 can provide the distance information for the benefit of the vehicle operator even though the vehicle operator is not operating the vehicle 10 during the automatic parking operation.

The video display 58 can also be manually or automatically engaged by the controller 62 to simultaneously show combinations of images corresponding to the side view mode, the AVM mode and/or the parallel parking mode. Hence, the vehicle operator can manually select the mode of operation (the AVM mode, the side view mode, the backup mode and/or the parallel parking mode) using the control panel 58.

However, the controller 62 is preferably configured to automatically operate in the AVM mode, generating images such as those shown in FIGS. 7-10, 11-12 and 15-16, and automatically switch to or simultaneously depict views in the side view mode (FIGS. 4-6) and/or parallel parking mode (FIGS. 13-14) when an object is detected approaching any one of the four sides of the vehicle 10 (the front side and area $A_1$, the rear side and area $A_2$, the passenger's side and area $A_3$ and/or the driver's side and area $A_4$).

The shapes and dimensions of the vehicle 10 stored in the memory 60 can also be re-set or re-dimensioned in response to modification of the physical dimensions of the vehicle 10. For example, if an aftermarket bumper fascia or spoiler has been added to the vehicle 10, the overall dimensions of the vehicle 10 can be changed. The controller 62 can include a data entry updating capability that enables modifications to the preset vehicle data stored in the memory 60. The controller 62 can further include uploading and downloading capabilities via, for example, WIFI, such that data collected by the controller 62 can be uploaded to other vehicles and/or traffic control databases, and conversely data collected by other vehicles and/or traffic control databases can be downloaded by the controller 62.

Returning now to the flowchart in FIG. 17, at step S2 the controller 62 processes the captured information from the plurality of sensors and the plurality of cameras and determines whether or not an object has been detected in one of the areas $A_1, A_2, A_3$ or $A_4$. If an object has not been detected, operation moves to step S3 where default display parameters are displayed. For example, in the AVM mode, the overhead simulated view of the vehicle 10 is displayed. If an object has been detected in step S2, operation moves to step S4.

At step S4 the distance between the adjacent outer surface 14 of the vehicle 10 and the detected object is determined. Specifically, the controller 62 utilizes the object information from any of the plurality of cameras and any of the plurality of sensors that is observing the detected object.

Next, at step S5, the controller 62 determines whether or not the determined distance is less than a first predetermined distance. If the detected object is not within the first predetermined distance, operation moves to step S11 where the controller 62 processes the received object information and, in the selected mode, displays the outer surface 14, the detected object and the superimposed indicia I including a numeric value corresponding to the determined distance between the object and the outer surface 14.

In step S5, if the detected object is within the first predetermined distance, operation moves to step S6. At step S6, the controller 62 selects a first display parameter for the distance between the detected object and the outer surface 14. The first display parameter can be a color, such as green indicating that the object is a significant distance from the vehicle 10.

Next is step S7, the controller 62 determines whether or not the detected object is within a second predetermined distance, less than the first predetermined distance. If the detected object is not within the second predetermined distance, operation moves to step S11 where the distance is displayed using the first display parameter. If the detected object is within the second predetermined distance, operation moves to step S8.

At step S8, the controller 62 then selects a second display parameter for the distance between the detected object and the outer surface 14. The second display parameter can be a color such as yellow, indicating that the object is still a safe distance from the vehicle 10, but is within a distance where the vehicle operator should use caution with respect to further movement of the vehicle 10. The second display parameter can also be combined with a first audible warning signal.

Next is step S9, the controller determines whether or not the detected object is within a third predetermined distance, less than the second predetermined distance. If the detected object is not within the third predetermined distance, operation moves to step S11 where the distance is displayed using the second display parameter. If the detected object is within the third predetermined distance, operation moves to step S10.

At step S10, the controller 62 selects a third display parameter for the distance between the detected object and the outer surface 14. The third display parameter can be a color, such as red indicating that the object is at a distance from the vehicle 10 where contact may be likely and where the vehicle operator should use extreme caution with respect to further movement of the vehicle 10. The third display parameter can also cause the displayed distance to begin blinking on the video display 56. The third display parameter can also be combined with a second audible warning signal that is different from the first audible warning. For example, the first audible warning signal can be a pulsing sound and the second audible warning signal can be a faster pulsing or continuous sound. Next, operation moves to step S11 where the distance is displayed using the third display parameter. From step S11, operation returns to step S1.

The object detection system 12 can be modified in any of a variety of ways. For example, in some vehicles only a part of the object detection system 12 may be installed. Specifically, in some vehicles the only object detection required can be at the rear of the vehicle 10. In such a vehicle, the front camera 40, the passenger's side camera 44, the driver's side camera 46, the front sensor 48, the passenger's side sensor 52 and the driver's side sensor 54 are all eliminated. Instead, only the rear camera 42 and the rear sensor 50 are included to detect objects in the area $A_2$, rearward of the vehicle 10 when the vehicle 10 is being backed up (in reverse).

Other modifications are also possible, as set forth in the second and third embodiments described below.

Second Embodiment

Figure 18:
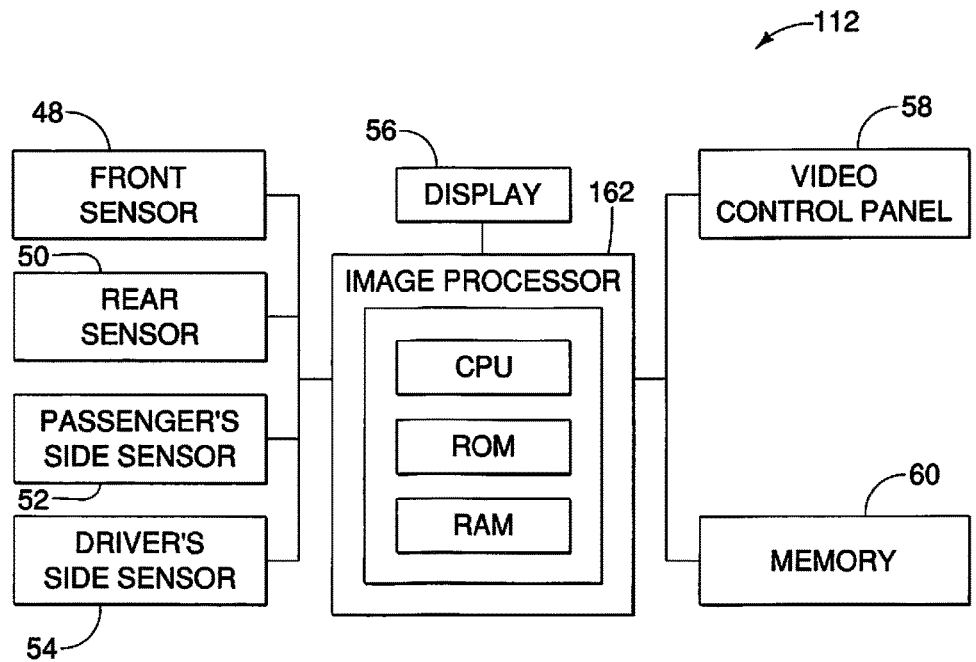
FIG. 18 is a block diagram of an object detection system of a vehicle, the object detection system including, among other elements, a plurality of sensors, a controller, a control panel and a video display in accordance with a second embodiment.

Referring now to FIG. 18, an object detection system 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the object detection system 112 includes many of the features described above with respect to the first embodiment, such as the front sensor 48, the rear sensor 50, the passenger's side sensor 52, the driver's side sensor 54, the video display 56, the control panel 58, the memory 60 and a controller 162. However, in the second embodiment, the plurality of cameras is eliminated.

In the second embodiment, the plurality of sensors (the front sensor 48, the rear sensor 50, the passenger's side sensor 52 and the driver's side sensor 54) captures all object information. The images generated by the controller 162 on the video display 56 are computer generated images. Therefore, the AVM mode is either eliminated or is produced using only computer generated images based upon the object information captured by the plurality of sensors.

Third Embodiment

Figure 19:
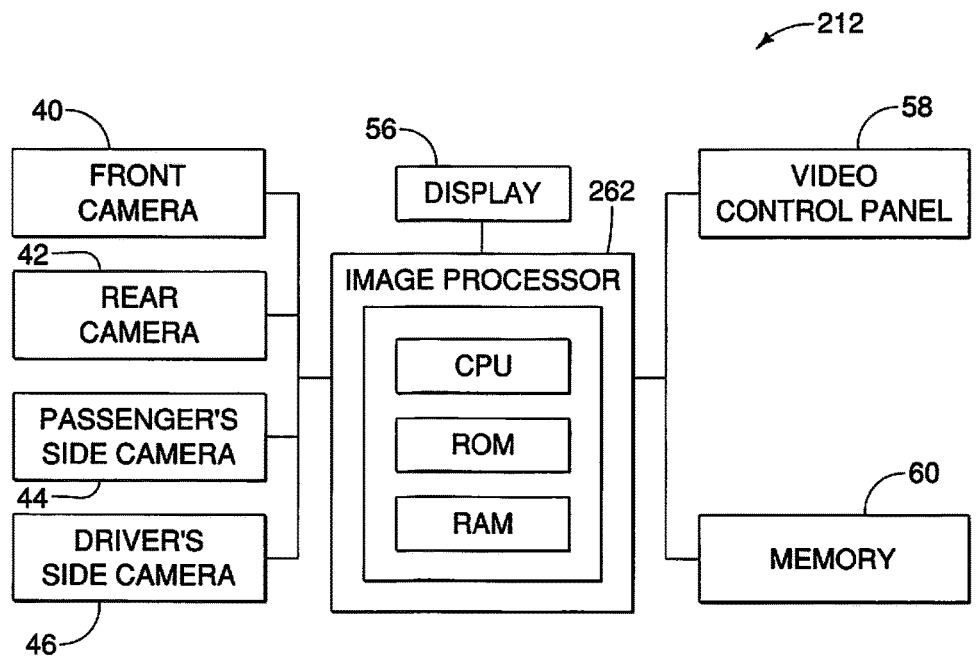
FIG. 19 is a block diagram of an object detection system of a vehicle, the object detection system including, among other elements, a plurality of the cameras, a controller, a control panel and a video display in accordance with a third embodiment.

Referring now to FIG. 19, an object detection system 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the object detection system 212 includes many of the features described above with respect to the first embodiment, such as the front camera 40, the rear camera 42, the passenger's side camera 44, the driver's side camera 46, the video display 56, the control panel 58, the memory 60 and a controller 262. However, in the third embodiment, the plurality of sensors is eliminated.

In the third embodiment, the plurality of cameras (the front camera 40, the rear camera 42, the passenger's side camera 44 and the driver's side camera 46) captures all object information. The front camera 40, the rear camera 42, the passenger's side camera 44 and the driver's side camera 46 can each include a stereo imaging capability such that each of the plurality of cameras has depth perception capability. Further, the controller 262 can be further configured to calculate the distance between surfaces of detected objects and the outer surface of the vehicle based upon images captured by the plurality of cameras, in combination with monitoring of the vehicle speed. Using observed changes in geometric relationships between surfaces of detected objects, in combination with known distances traveled (based on speed), heights and distances of the detected object can be determined by the controller 262.

The controller 262 preferably includes a microcomputer with an object detection program that processes images from the plurality of cameras and processes object information detected by the plurality of sensors. The controller 62 further generates images that are transmitted to the video display 56 and further controls the video display 56. The controller 62 can also include other conventional components such as an input interface circuit connected to the control panel 58, the cameras and the sensors, an output interface circuit connected to the video display 56 and an audio signal generator (not shown) for emitting audible warnings, and storage devices such as a ROM (Read Only Memory) device and a RAM (Random Access Memory) device, and the memory 60.

It will be apparent to those skilled in the art from this disclosure that the precise structure and algorithms for the controller 62 can be any combination of hardware and software that will carry out the functions of the present invention.

In the first and second embodiments, the plurality of sensors actually measures the distance between the detected object and the outer surface 14 of the vehicle 10 using one of the above mentioned detection and ranging devices. Such devices are known to be accurate to within less than a millimeter. Such devices are well known and therefore further description is omitted for the sake of brevity. The terms "measured distance" and "determined distance" are used interchangeably.

In the third embodiment, the distance between the object and the outer surface of the vehicle is determined based upon visual observation of geometric changes in captured images and known vehicle location changes (based on speed). However, such evaluations of visual object information are characterized herein as producing both a "measured distance" and a "determined distance". The determination of the distance between the object and the vehicle can also include a determination of the height of the object relative to the vehicle.

Various vehicle and vehicle body structure elements described herein are conventional components that are well known in the art. Since these elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the object detection system. Accordingly, these terms, as utilized to describe the present invention should be interpreted relative to a vehicle equipped with the object detection system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle object detection system comprising:
a vehicle body structure having an outer surface and defining a vehicle longitudinal direction;
a plurality of sensors configured to detect an object within a prescribed area adjacent to the outer surface of the vehicle body structure;
a video display installed to the vehicle body structure; and
a controller configured to process object information received from the plurality of sensors, determine the distance between the outer surface of the vehicle body structure and the object, and display on the video display a faux representation of the object, a faux representation of the outer surface of the vehicle body structure and a numeric representation of the distance between the outer surface of the vehicle body structure and the object, the controller being further configured to switch between operating the video display in display modes including a parallel parking view mode and a backup mode, such that
in the parallel parking view mode the faux representation of the outer surface includes a faux representation of the one of the passenger's side of the vehicle or the driver's side of the vehicle looking in a horizontal direction parallel to the vehicle longitudinal direction from one end of the vehicle with a faux representation of the prescribed area being adjacent to the one of the passenger's side or the driver's side of the vehicle, and
in the backup mode the faux representation of the outer surface includes a faux representation of the rear bumper fascia looking from one side thereof with a faux representation of the prescribed area being adjacent to a rear end of the vehicle.

2. The vehicle object detection system according to claim 1, further comprising
at least one camera aimed at a portion of the prescribed area adjacent to the outer surface of the vehicle body structure, the at least one camera being connected to the controller such that the controller selectively displays images captured by the camera on the video display in a display mode that includes only the images captured by the camera and data received from only one of the plurality of sensors.

3. The vehicle object detection system according to claim 1, wherein
the plurality of sensors are all the same type of sensor device and are selected from the following group of sensors consisting of: sonar emitting and detecting devices, a radar emitting and detecting devices, infrared emitting and detecting devices and laser light emitting and light detecting devices.

4. The vehicle object detection system according to claim 1, wherein
the controller is further further configured to switch to any one of a plurality of additional display modes, including a side view mode in which the faux representation of the outer surface includes a faux representation of the front bumper fascia looking from one lateral side thereof the vehicle with the prescribed area in a faux representation thereof being adjacent to a front end of the vehicle.

5. The vehicle object detection system according to claim 1, wherein
the controller being further configured to automatically operate the video display in response to the vehicle operating at a speed of below 10 mph.

6. The vehicle object detection system according to claim 1, wherein
the sensing device includes a plurality of video cameras mounted to the vehicle body structure; and
the controller is configured to display in another display mode on the video display, an overhead composite view including a representation of the vehicle body structure with superimposed video images of areas around the vehicle body structure and further display the object with the distance superimposed between the object and the vehicle body structure.

7. The vehicle object detection system according to claim 1, wherein
the video display is located within the passenger compartment.

8. The vehicle object detection system according to claim 1, wherein
the video display is located within a side view mirror fixed to an outer surface of a vehicle door of the vehicle body structure.

9. The vehicle object detection system according to claim 1, wherein
the sensors are further configured to detect a plurality of objects within the prescribed area adjacent to the outer surface of the vehicle body structure, and
the controller is further configured to process further object information received from the sensing device, determine the distance between the outer surface of the vehicle body structure and each of the plurality of objects, and display on the video display a representation of the plurality of objects and the distances between the outer surface of the vehicle body structure and each of the plurality of objects.

10. The vehicle object detection system according to claim 9, wherein
the controller is further configured to display on the video display the numeric distance between the outer surface and a first of the plurality of object in a first color, and display on the video display the numeric distance between the outer surface and a second of the plurality of object in a second color.

11. The vehicle object detection system according to claim 9, further comprising:
an eye gaze camera installed to the vehicle body structure configured to capture images of a vehicle operator's eye, and
the controller is further configured to process images captured by the eye gaze camera and correlate aim of the vehicle operator's eye to one objects of the plurality of objects and display on the video display a faux representation of the plurality of objects, and a numeric representation of the distance between the outer surface of the vehicle body structure and the one object.

12. The vehicle object detection system according to claim 1, wherein
the controller is further configured to re-determine the distance between the outer surface of the vehicle body structure and the object in response to movement of the vehicle body structure relative to the object, and display a re-determined distance between the outer surface of the vehicle body structure and the object.

13. The vehicle object detection system according to claim 1, wherein
the controller is further configured determine distances between the outer surface of the vehicle body structure and a plurality of surfaces of a multi-surface object including determining a first distance between the outer surface of the vehicle body structure and a first surface of the object, and determining a second distance between the outer surface of the vehicle body structure and a second surface of the object and further configured to display the first distance adjacent a faux representation of the first surface of the object, and display the second distance adjacent a faux representation of the second surface of the object.

14. A vehicle object detection system comprising:
a vehicle body structure having an outer surface and defining a vehicle longitudinal direction;
a plurality of sensors configured to detect an object within a prescribed area adjacent to the outer surface of the vehicle body structure;
a video display installed to the vehicle body structure; and
a controller configured to process object information received from the plurality of sensors and display on the video display a faux representation of the object and a faux representation of the outer surface of the vehicle body structure, the controller being further configured to switch between operating the video display in display modes including a parallel parking view mode and a backup mode, such that
in the parallel parking view mode the faux representation of the outer surface includes a faux representation of the one of the passenger's side of the vehicle or the driver's side of the vehicle looking in a horizontal direction parallel to the vehicle longitudinal direction from one end of the vehicle with a faux representation of the prescribed area being adjacent to the one of the passenger's side or the driver's side of the vehicle, and
in the backup mode the faux representation of the outer surface includes a faux representation of the rear bumper fascia looking from one side thereof with a faux representation of the prescribed area being adjacent to a rear end of the vehicle.

15. The vehicle object detection system according to claim 14, wherein
the controller is further configured to determine the distance between the outer surface of the vehicle body structure and the object, and display on the video display a numeric representation of the distance between the outer surface of the vehicle body structure and the object.

16. The vehicle object detection system according to claim 15, wherein the controller being further configured to automatically operate the video display in response to the vehicle operating at a speed of below 10 mph.

17. A vehicle object detection system comprising:

a vehicle body structure having an outer surface and defining a vehicle longitudinal direction;

a plurality of sensors configured to detect an object within a prescribed area adjacent to the outer surface of the vehicle body structure;

a video display installed to the vehicle body structure; and a controller configured to process object information received from the plurality of sensors, and display on the video display a faux representation of the object and a faux representation of the outer surface of the vehicle body structure, the controller being further configured to operate the video display in plurality of display modes including a parallel parking view mode such that in the parallel parking view mode the faux representation of the outer surface includes a faux representation of the one of the passenger's side of the vehicle or the driver's side of the vehicle looking in a horizontal direction parallel to the vehicle longitudinal direction from one end of the vehicle with a faux representation of the prescribed area being adjacent to the one of the passenger's side or the driver's side of the vehicle.

18. The vehicle object detection system according to claim 17, wherein the controller is further configured to switch the video display to operate the video display in a backup mode such that the faux representation of the outer surface includes a faux representation of the rear bumper fascia looking from one side thereof with a faux representation of the prescribed area being adjacent to a rear end of the vehicle.

\* \* \* \* \*